(No Model.)
C. B. FITHIAN.
CAR BRAKE.
No. 387,219. Patented Aug. 7, 1888.
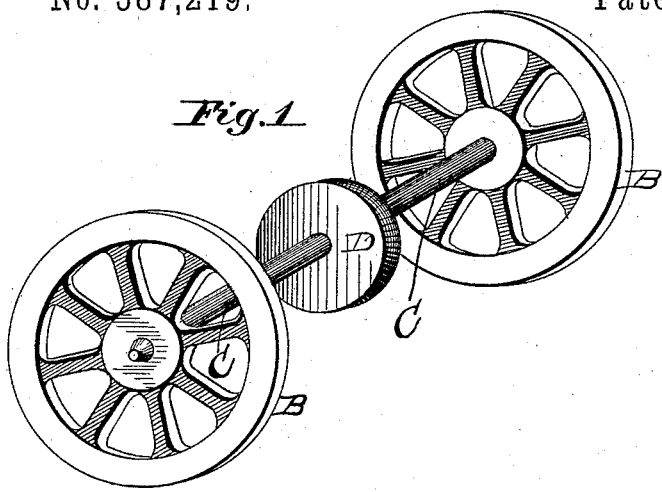
Fig. 1.
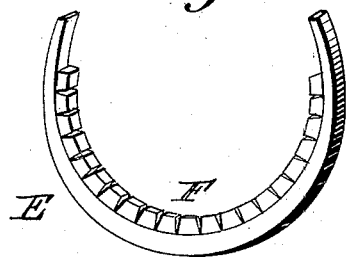
Fig. 2.
Fig. 3.
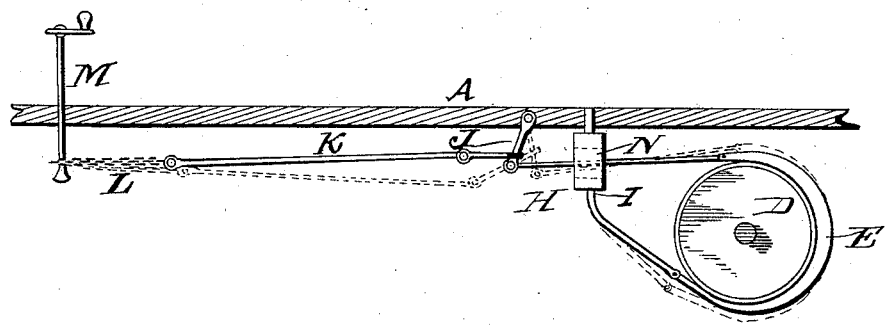
Fig. 4
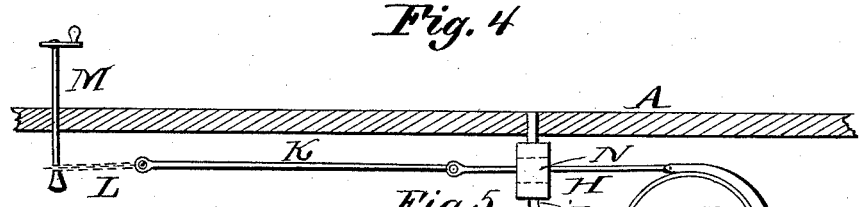
Fig. 5.
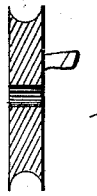
Witnesses:
B. C. Fenwick
C. E. Jones
Inventor
Charles B. Fithian
By his attorney
Chas. J. Gooch

UNITED STATES PATENT OFFICE.

CHARLES B. FITHIAN, OF CAMDEN, NEW JERSEY.

CAR-BRAKE.

SPECIFICATION forming part of Letters Patent No. 387,219, dated August 7, 1888.

Application filed November 24, 1885. Serial No. 183,877. (No model.)

*To all whom it may concern:*

Be it known that I, CHARLES B. FITHIAN, a citizen of the United States of America, residing at Camden, in the county of Camden and State of New Jersey, have invented certain new and useful Improvements in Car-Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in car-brakes.

The invention consists of a brake-wheel, keyed or otherwise securely mounted upon the axle, and having a smooth-faced concaved periphery, a curved plate-spring attached at one end to a beam or timber beneath the floor of the car and at its opposite end to a lever connected to the brake operative mechanism, said spring having on its inner face a series of blocks of wood or metal, which, when the brake mechanism is placed in operation and the spring curved around the brake wheel or disk, engages with and produces great friction on the surface of the brake-wheel, and thus clamps the same and retards the revolution of the axle and the wheel connected thereto.

In the accompanying drawings, Figure 1 represents a perspective view of a car axle and wheels with my improved brake-wheel in position. Fig. 2 represents a perspective view of the brake-spring. Fig. 3 represents an elevation of a portion of the floor of a car and one axle with my improved brake mechanism in position. Fig. 4 represents a similar view showing a modification. Fig. 5 represents a sectional view of the brake-wheel.

A represents the floor of the car, B the wheels, and C the axle, all of which are of usual construction.

D represents my improved brake-wheel, which is keyed or otherwise firmly secured to the axle C at or about the center thereof. This brake-wheel is of concave form peripherally and has a smooth surface.

E represents my improved brake or gripping spring. This spring is of substantially C shape, formed of plate metal, of curved form, as shown, to adapt it to readily embrace the brake-wheel when it is desired to brake the car. On the inner face of this spring is a series of blocks of wood or metal, F, of tapering form, as shown, or having spaces between them, and which may be attached to the inner face of the spring, either singly or in series, by rivets or any known means. The wooden lining to said spring may be formed of a single one or more strips of wood or metal having a series of projections or blocks formed thereon or attached thereto at intervals. This spring is of such size and stiffness that normally it positively throws the block F out of the groove in the wheel D; but when it is bowed around the brake wheel or disk, in order to clamp the brake-wheel, the blocks F come together and form a smooth surface, which grips the wheel and exerts great frictional power therein. The lower end of this brake-spring is attached, by bolts, rivets, or other suitable means, to a timber or beam, H, supporting the floor of the car, as shown at I, or to a block beneath the car-floor, as may be found most convenient. The opposite end of this spring is connected to a bell-crank or other suitably-shaped lever, J, supported in bearing beneath the car-floor, said lever connecting with the brake-rod K, chain L, and upright lever or operative rod M, as represented in Fig. 3; or said spring may at its upper end be connected directly to the brake rod K, and either it or the inner end of said brake-rod reciprocate in a guideway, N, in or on the depending timber or beam H, as represented in Fig. 4 of the drawings. The full lines represent the position the brake mechanism assumes when in operation, and the dotted lines represent its position when at rest.

When it is desired to operate the brake mechanism to brake a car, the brakeman turns the operative rod M in the usual manner, which act winds the chain L around the lower end of said rod and draws upon the brake-rod, which latter, as it passes toward the operative rod M, draws with it the upper end of the brake-spring connected thereto, and thus curves said spring closely upon the brake-wheel D. As said spring thus comes into operative contact with the brake-wheel, the projections upon the inner face of said spring meet and thus form a smooth surface, which engages with and around the periphery of the brake-wheel and firmly grips the same. By providing said spring with projections, teeth, or ribs, as shown and described, a positive gripping and increased frictional contact between the spring and brake-wheel is secured without any danger of their braking properties being lost. By forming the gripping-lining of the spring separate from and attaching it to the inner face of the spring, the frictional wear incident to the braking of the wheel is taken up by said lining and the spring remains uninjured, and said lining can be renewed as often as necessary without necessitating the renewal of the spring. By forming the brake-wheel with a concaved periphery, the spring is enabled to rest and fit therein during the braking, and will thus exert increased frictional power upon the brake-wheel and axle, and an additional safeguard against the slipping away of the spring from said wheel is secured. Upon the operative rod M being turned to release the brake mechanism, the spring will automatically retract and free itself from the brake-wheel, as shown in dotted lines, thus reducing the lost motion to a minimum.

I am aware that it is not new to provide a car-axle with a peripherally-grooved wheel, with which wheel a friction-strap partially surrounding it is made to engage through suitable operating devices which tighten the strap upon the wheel. My invention differs therefrom, however, in that the encircling spring-strap E is provided with the wearing-blocks F, which increase the efficiency of the brake, and at the same time take all wear from the strap, which is the expensive portion of the friction device, and further in making the band E elastic, or with sufficient spring tendency to, of itself, throw off the said blocks from engagement with the wheel as soon as the tension thereon is relieved.

Having thus described my invention, what I claim is—

1. A car-brake consisting of a grooved wheel, D, a curved substantially C-shaped spring-band, E, carrying a series of bearing-blocks fitted to said groove, said spring-band being secured at one end to a rigid support carried by the car, and at the other end to the brake-operating devices, the spring-band being arranged to positively throw the blocks out of engagement with the grooved wheel when released, substantially as described.

2. In a car-brake, the combination of a brake-wheel, an encircling friction-strap engaging therewith, a slotted support, H, carried below the car, to which one end of the brake-strap is secured, and the brake-rod connected to the free end of the brake-strap and supported to slide in the slot in the support H, substantially as described.

In testimony whereof I affix my signature in presence of two witnesses.

CHARLES B. FITHIAN.

Witnesses:
 T. F. BOARDMAN,
 JAMES M. CASSADY.